United States Patent
Hsu et al.

(10) Patent No.: US 7,813,760 B2
(45) Date of Patent: Oct. 12, 2010

(54) METHOD OF CONTROLLING COMMUNICATION MECHANISM UTILIZED TO ARBITRATE TRANSMISSIONS OF WIRELESS SIGNALS AND COMMUNICATION APPARATUS UTILIZING THE SAME

(75) Inventors: Hong-Kai Hsu, Taipei County (TW); Hsien-Chang Liu, Nantou County (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 673 days.

(21) Appl. No.: 11/768,911

(22) Filed: Jun. 27, 2007

(65) Prior Publication Data

US 2009/0004979 A1    Jan. 1, 2009

(51) Int. Cl.
*H04M 1/00* (2006.01)
(52) U.S. Cl. .............. 455/553.1; 455/552.1; 455/127.4; 455/115.3; 455/116; 455/123
(58) Field of Classification Search .................... 455/73, 455/78, 115.1–115.4, 553.1, 552.1, 127.4, 455/116, 123; 370/278, 282
See application file for complete search history.

(56) References Cited

U.S. PATENT DOCUMENTS

2002/0136233 A1    9/2002  Chen
2004/0192222 A1*   9/2004  Vaisanen et al. .............. 455/78
2005/0272467 A1*  12/2005  Chiu et al. ............... 455/553.1

FOREIGN PATENT DOCUMENTS

EP    1 119 137 A1    7/2001

OTHER PUBLICATIONS

Digital cellular telecommunications system (Phase 2+); Radio subsystem link control (3GPP TS 05.08 version 8.9.0 Release 1999), chapter 5.

* cited by examiner

*Primary Examiner*—Ajit Patel
*Assistant Examiner*—Khai M Nguyen
(74) *Attorney, Agent, or Firm*—Winston Hsu; Scott Margo; Min-Lee Teng

(57) ABSTRACT

A method of controlling a communication mechanism utilized to arbitrate transmissions of a first and a second wireless signals and a communication apparatus utilized the method are disclosed. The method includes determining a transmission quality indicator corresponding to one of the first wireless signal and the second wireless signal, and dynamically turning the communication mechanism on or off according to the transmission quality indicator. Therefore, the present invention is able to arbitrate transmissions of different wireless signals while decreasing the occurrence of transmission disconnection resulted from the arbitration.

22 Claims, 2 Drawing Sheets

METHOD OF CONTROLLING COMMUNICATION MECHANISM UTILIZED TO ARBITRATE TRANSMISSIONS OF WIRELESS SIGNALS AND COMMUNICATION APPARATUS UTILIZING THE SAME

BACKGROUND

The present invention relates to a communication apparatus applied to a wireless network and a method thereof, and more particularly, to a method of controlling a communication mechanism utilized to arbitrate transmissions of a first wireless signal corresponding to a first wireless standard and a second wireless signal corresponding to a second wireless standard, and a communication apparatus utilizing the method.

In present wireless communication systems, in order to sufficiently utilize advantages of different wireless techniques, such as Bluetooth, WiFi or WiMAX, several wireless techniques are integrated in a single communications device. For example, Bluetooth and WiFi techniques are implemented in a mobile phone or PDA in a voice over wireless area network (VoWLAN) to transmit voice signals and data. However, since Bluetooth and WiFi signals both work at the frequency band 2.4-2.48 GHz, there will be interference between them when they are put to use simultaneously in the VoWLAN. To solve this problem, mechanisms utilized to arbitrate transmissions of different wireless signals that may cause interference to each other when transmitted/received are developed. Packet traffic arbitration (PTA) is a conventional mechanism often adopted to solve the coexistence problem of Bluetooth and WiFi. In brief, the PTA mechanism controls the transmission of WiFi signal. That is, it arbitrates and decides whether to let the WiFi module to send out the WiFi signal immediately or to block and delay the transmission of WiFi signal generated by the WiFi module. Therefore, Bluetooth and WiFi transmissions are interlaced in the time domain and will not generate interference to each other. Because the PTA mechanism is fully detailed in the 802.15.2 specification, detailed introduction of the PTA mechanism is omitted for the sake of brevity.

As those of ordinary skill in the art will readily appreciate, in the wireless network, when the signal quality is poor or the packet size is large, an access point will apply the Request to Send/Clear to Send (RTS/CTS) mechanism before sending packets to prevent hidden node effect. That is, when the access point wants to send a packet to a mobile station, it first sends an RTS packet to the mobile station, and the mobile station broadcasts a CTS packet after receiving the PTS packet. Only when the access point receives the CTS packet can it send the data packet. However, when the PTA mechanism and the RTS/CTS mechanism are both active, the mobile station may not be able to send the CTS packet promptly since the PTA mechanism controls the transmitting authority of the mobile station. In a situation where both the Bluetooth and the WiFi modules ask permission to send packets at the same time, the Bluetooth packet will be sent immediately while the transmission of the WiFi packet will be delayed because of the higher transmission priority assigned to Bluetooth packets. Therefore, if the WiFi module is going to send the CTS packet to the access point, the delay may cause the CTS packet to fail to reach the access point in time, and when the access point cannot receive the CTS packet from the station during a specific time period (i.e. 10 μs), the WiFi connection between the access point and the mobile station is given up, and a disconnection event (de-authentication or disassociation) is sent to the mobile station. In this situation, the user will hear an apparent voice mute. The voice mute may last for a significant period of time because the security mechanism of the wireless network will obstruct the instant reconnection of the mobile station.

SUMMARY

One objective of the present invention is therefore to provide a method of controlling a communication mechanism and a communication apparatus utilizing the same. The present invention is able to arbitrate transmissions of different wireless signals while decreasing the occurrence of transmission disconnection resulting from the arbitration.

According to an exemplary embodiment of the present invention, a method of controlling a communication mechanism utilized to arbitrate a transmission of a first wireless signal corresponding to a first wireless standard and a transmission of a second wireless signal corresponding to a second wireless standard is disclosed. The method comprises determining a transmission quality indicator corresponding to one of the first wireless signal and the second wireless signal, and dynamically turning the communication mechanism on or off according to the transmission quality indicator.

According to another exemplary embodiment of the present invention, a communication apparatus able to arbitrate a transmission of a first wireless signal corresponding to a first wireless standard and a transmission of a second wireless signal corresponding to a second wireless standard is disclosed. The communication apparatus comprises an arbitrating module, for controlling the transmission of the first wireless signal and the transmission of the second wireless signal; and a control module, coupled to the arbitrating module, for determining a transmission quality indicator corresponding to one of the first and the second wireless signals and dynamically turning the arbitrating module on or off according to the transmission quality indicator.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
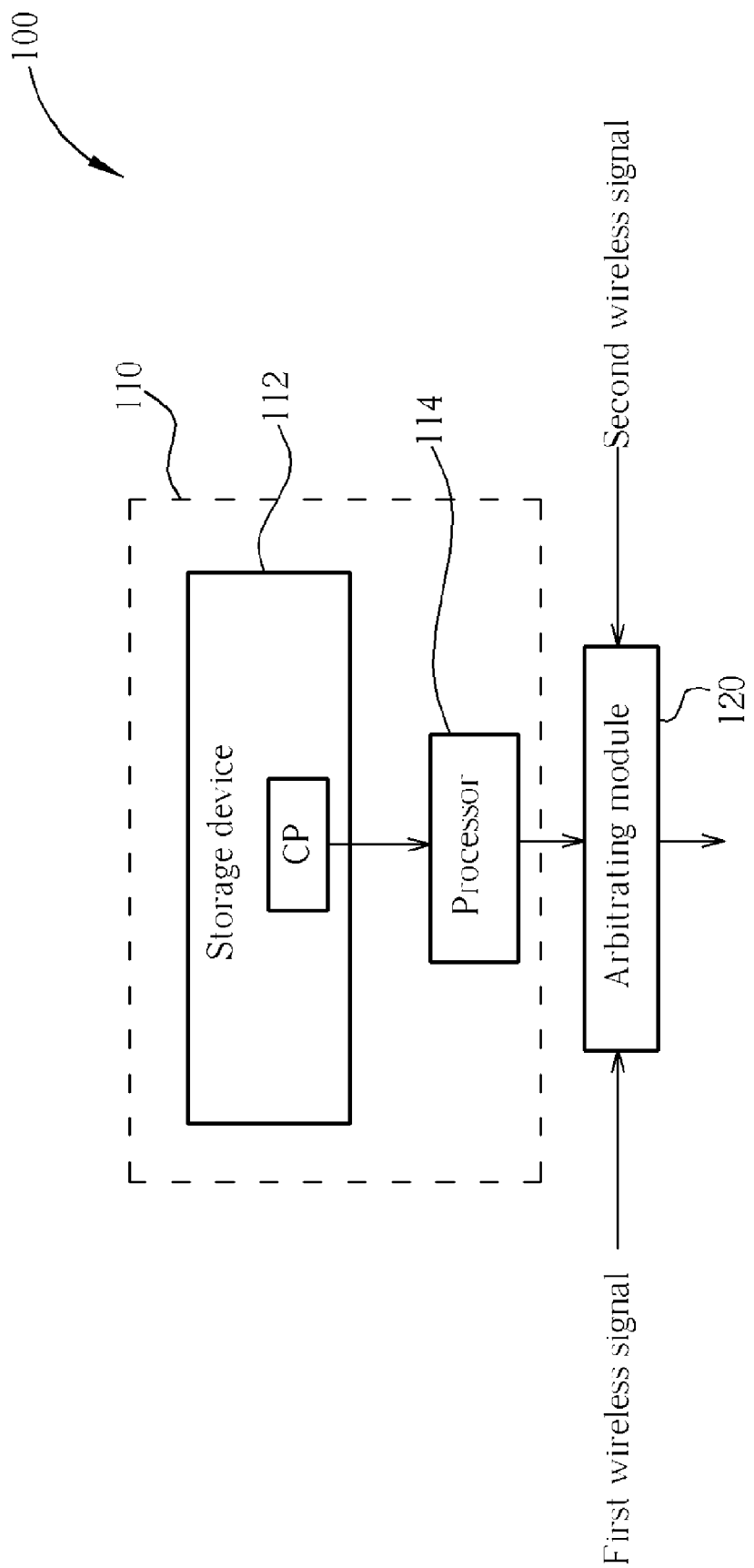
FIG. 1 is a diagram of a communication device according to an exemplary embodiment of the present invention.

Please refer to FIG. 1, which is a diagram of a communication apparatus 100 able to arbitrate transmissions of different wireless signals according to an exemplary embodiment of the present invention. The communication apparatus 100 comprises a control module 110 and an arbitrating module 120, wherein the control module 110 further comprises a storage device 112 storing a control program CP and a processor 114. It should be noted that only the components pertinent to technical features of the present invention are shown in FIG. 1. The arbitrating module 120 can be a PTA module for arbitrating transmissions of a first wireless signal and a second wireless signal according to the PTA mechanism. More specifically, the first wireless signal and the second wireless signal are generated and transmitted by a first wireless module and a second wireless module (both not shown) respectively, and the arbitrating module 120 decides if the first wireless signal or the second wireless signal is allowed to be sent immediately or should be delayed. In this embodiment, transmission priority of the first wireless signal is higher than that of the second wireless signal, and therefore the arbitrating module 120 operates according to the transmission of the first wireless signal, allowing the second wireless signal to be transmitted only when the first wireless signal is not sent over. Bluetooth and WiFi signals are taken as an example of the first and the second wireless signals. Since Bluetooth has higher priority in transmission than WiFi, the arbitrating module 120 will always enable the Bluetooth signal to be transmitted first, resulting in the disconnection of WiFi as mentioned before.

To decrease the occurrence of the disconnection events, the processor 114 of the control module 110 executes the control program CP stored in the storage device 112 to determine a transmission quality indicator corresponding to transmission quality of the WiFi signal and dynamically turn the arbitrating mechanism of the arbitrating module 120 on or off according to the transmission quality indicator. When the arbitrating mechanism of the arbitrating module 120 is on, the transmission of the WiFi signal is controlled by the arbitrating module 120 according to the arbitrating mechanism. That is, when arbitrating mechanism of the arbitrating module 120 is on, the arbitrating module 120 will arbitrate and decide whether to block and delay the transmission of the WiFi signal or not. However, when the arbitrating mechanism of the arbitrating module 120 is off, there is no block to the transmission of the WiFi signal, and therefore the WiFi signal can always transmit when it is generated, eliminating the reason that causes the disconnections of the WiFi signal as mentioned above.

In one embodiment, the processor 114 can detect disconnections of the WiFi signal to determine the transmission quality indicator, and turn off the PTA mechanism of the arbitrating module 120 when the PTA mechanism is on and the transmission quality indicator reaches a second threshold value. That is, when the WiFi connection between the communication apparatus 100 and an access point (not shown) is cut off frequently due to the PTA mechanism, the processor 114 adaptively turns off the PTA mechanism to let Bluetooth and WiFi modules work independently. By doing so, the occurrence frequency of the disconnection events can be decreased since the WiFi signal does not need to wait and can be transmitted immediately. The interference between Bluetooth and WiFi signals will not be significant in this situation since the transmission quality of the WiFi signal already has some problems. Another reason that the interference between Bluetooth and WiFi signals can be controlled is that other mechanisms arbitrating transmissions of Bluetooth and WiFi signals in the frequency domain, such as adaptive frequency hopping (AFH), can be applied to help reduce the interference problem when the PTA mechanism is turned off.

Moreover, the processor 114 can calculate a time period in which the transmission of the WiFi signal maintains a continuous connection to determine the transmission quality indicator, and turn on the PTA mechanism when the PTA mechanism is off and the transmission quality indicator reaches a first threshold value. In other words, the processor 114 turns on the PTA mechanism once more when the WiFi connection is maintained at a stable level for an appropriate time period. This is workable because, when the transmission quality is poor, a user may notice this phenomenon by hearing noise or voice mute and may change his/her location to try to improve the transmission quality. After the user moves to a new location, the connection may become stable since the signal quality improves, and the processor 114 will turn the PTA mechanism on to provide the arbitration function once more.

As mentioned above, the control module 110 controls the on/off status of the PTA mechanism adaptively by means of software control offered by the processor 114 running the control program CP; however, this is not meant to be a limitation of the present invention. In an alternative design, the control module 110 can be implemented by pure hardware for controlling the on/off status of the PTA mechanism without running any program execution codes. Furthermore, the control module 110 can be implemented by any combination of hardware and software to control the on/off status of the PTA mechanism. These also fall in the scope of the present invention.

Figure 2:
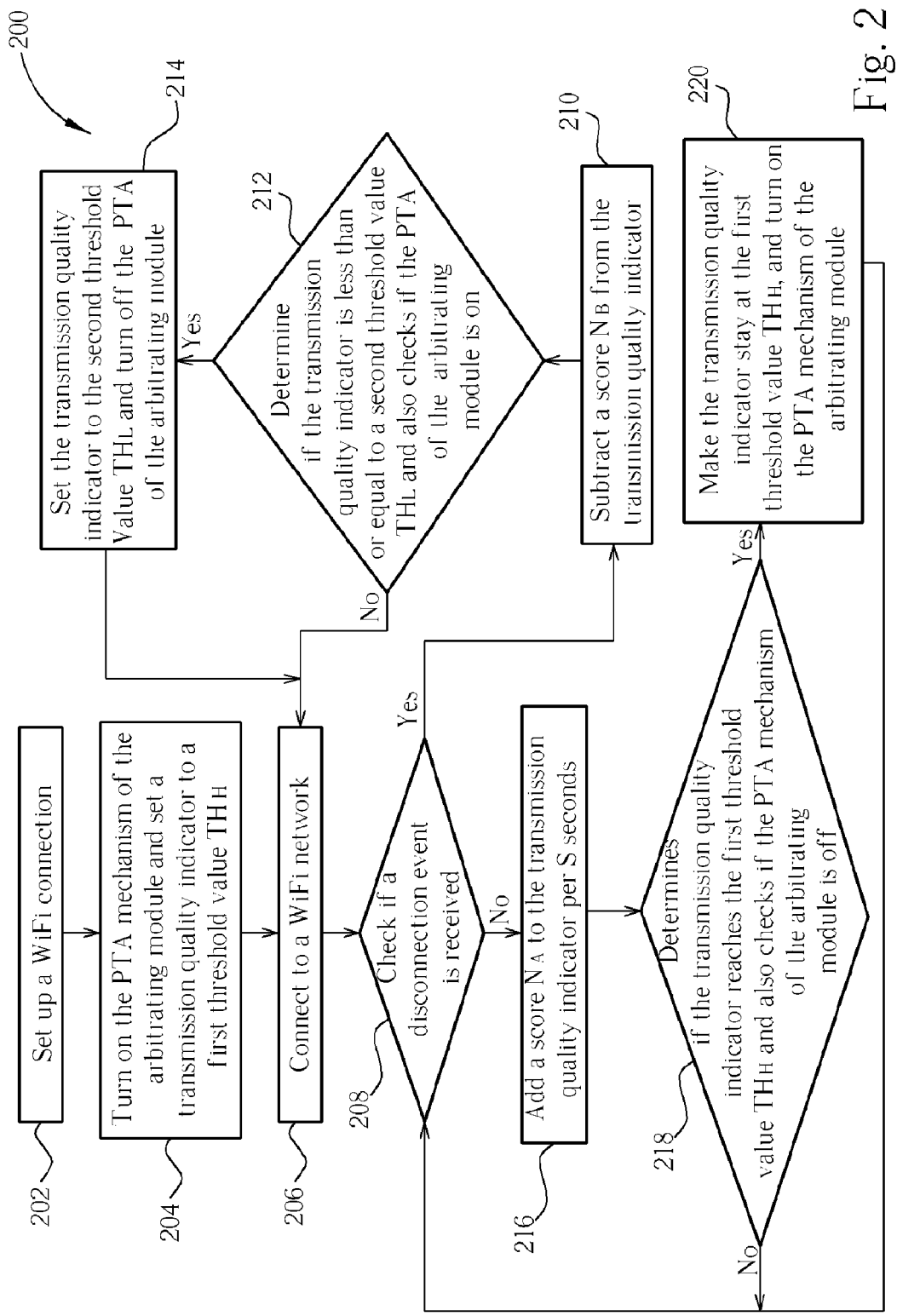
FIG. 2 is a flow chart of a control process according to an exemplary embodiment of the present invention.

The following is a detailed description of the control process performed by the processor 114. FIG. 2 is a flow chart of the control process 200 according to an exemplary embodiment of the present invention. As shown in FIG. 2, a WiFi profile is first chosen to set up a WiFi connection in step 202, then the processor 114 turns on the PTA mechanism of the arbitrating module 120, and sets a transmission quality indicator to a first threshold value $TH_H$ (step 204). Note that a new WiFi profile can be chosen at any time, and the control process 200 will return to step 202 correspondingly, that is, the transmission quality indicator will be set as the first threshold value $TH_H$ and the PTA will be turned on again.

Next, the communication apparatus 100 is connected to a WiFi network (step 206). The processor 114 runs the control program CP to monitor the WiFi transmission for checking if a disconnection event (de-authentication or disassociation) is received from an access point (step 208), and if a disconnection event is received, the control process 200 proceeds to step 210, subtracting a score $N_B$ from the indicator. The processor 114 then determines if the transmission quality indicator is less than or equal to a second threshold value $TH_L$ and also checks if the PTA of the arbitrating module 120 is on (step 212). If the determining result shows that the transmission quality indicator is less than or equal to the second threshold value $TH_L$ and the PTA is on, the transmission quality indicator is set to the second threshold value $TH_L$ and the PTA is turned off by the processor 114 (step 214), and the reconnection mechanism is started to reconnect the WiFi network (step 206). Otherwise, the process 200 still proceeds to step 206 to reconnect the WiFi network, but the transmission quality indicator and the PTA setting are not changed.

However, if a disconnection event is not received within a predetermined time interval, i.e. S seconds, the processor 114 adds a score $N_A$ to the transmission quality indicator until the transmission quality indicator reaches the first threshold value $TH_H$ (step 216). That is, when the connection is maintained stably for S seconds the indicator is added with the score $N_A$, but once a disconnection occurs (i.e. the disconnection event is received), the control process 200 enters step 210 to subtract $N_B$ from the transmission quality indicator, and the processor 114 restarts the counting of S seconds from the time point when the disconnection event is received. After the transmission quality indicator is added with $N_A$, the processor 114 determines if the transmission quality indicator reaches the first threshold value $TH_H$ and also checks if the PTA mechanism of the arbitrating module 120 is off (step 218). If the transmission quality indicator does not reach the first threshold value $TH_H$ or the PTA mechanism is not turned off, the process 200 returns to step 208 to check if the disconnection occurs again. Otherwise, the processor 114 makes the transmission quality indicator stay at the first threshold value $TH_H$, turns on the PTA mechanism (step 220), and checks if the disconnection occurs again (step 208).

An embodiment of the aforementioned parameters in the control process 200 is to choose the first threshold value $TH_H$ as 10, the second threshold value $TH_L$ as 0, the score $N_A$ to be 1, the score $N_B$ to be 5, and S to be 5. In this way, the PTA mechanism is turned off when two disconnection events are received from the access point in 5 seconds, and is turned on when the connection is kept stable for more than 50 seconds. Please note that these choices are based on statistics of experiment results, and are for exemplary purposes only rather than limitations of the present invention.

As can be seen, the processor 114 adaptively turns on or off the PTA mechanism according to the transmission quality of the WiFi signals. The performance or the operation of Bluetooth will not affect the control process 200 disclosed above. It should be noted that the present invention solves the disconnection problem resulting from a communication mechanism (e.g. PTA mechanism) arbitrating the transmissions of two wireless signals in the time domain. Therefore, the present invention is suitable for wireless signals whose bandwidths are overlapped resulting in a need for their transmissions to be arbitrated by a communication mechanism but where the communication mechanism may cause disconnection problems to occur. For example, the first wireless signal can be a Bluetooth signal, and the second wireless signal can be a WiFi signal, Worldwide Interoperability for Microwave Access (WiMAX) signal, High Performance Radio Local Area Network (HIPERLAN) signal or a Digital Enhanced Cordless Telecommunications (DECT) signal.

When the communication apparatus 100 or the control process 200 is implemented in a VoWLAN system, such as a VoIP dual mode phone product, it can significantly improve the WiFi connection stability when WiFi and Bluetooth co-exist in the same product. During the simulations, the quality of the WiFi signal can be maintained as the WiFi signal does not co-exist with the Bluetooth signal. The voice quality is kept by decreasing the short voice mutes generated from the disconnection events. Most importantly, these benefits can all be accomplished by a simple structure with low production cost.

Those skilled in the art will readily observe that numerous modifications and alterations of the device and method may be made while retaining the teachings of the invention.

What is claimed is:

1. A method of controlling transmissions of wireless signals corresponding to different wireless standards, comprising:
   arbitrating between a transmission of a first wireless signal corresponding to a first wireless standard and a transmission of a second wireless signal corresponding to a second wireless standard;
   determining a first transmission quality indicator corresponding to transmission quality of the second wireless signal;
   stopping the arbitrating when the first transmission quality indicator reaches a first threshold value;
   calculating a time period in which the transmission of the second wireless signal maintains continuous connection; and
   updating the first transmission quality indicator each time the time period is reaches a specific time length.

2. The method of claim 1, further comprising:
   turning on arbitration when arbitration is off and the first transmission quality indicator reaches a second threshold value.

3. The method of claim 1, wherein the step of updating the first transmission quality indicator each time the time period is reached comprises:
   updating the first transmission quality indicator to reduce a difference between the first transmission quality indicator and the first threshold value.

4. The method of claim 1, wherein the step of determining the first transmission quality indicator further comprises:
   detecting disconnections of transmission of the second wireless signal to determine the first transmission quality indicator.

5. The method of claim 4, wherein the step of detecting disconnections of the second wireless signal comprises updating the first transmission quality indicator each time a disconnection of the second wireless signal is detected.

6. The method of claim 5, wherein the step of updating the first transmission quality indicator each time a disconnection of the second wireless signal is detected comprises:
   updating the first transmission quality indicator to reduce a difference between the first transmission quality indicator and the second threshold value.

7. The method of claim 1, wherein bandwidths of the first wireless signal and the second wireless signal are overlapped.

8. The method of claim 1, wherein the first wireless signal is a Bluetooth signal, and the second wireless signal is a Wireless Fidelity (WiFi) signal, Worldwide Interoperability for Microwave Access (WiMAX) signal, High Performance Radio Local Area Network (HIPERLAN) signal or a Digital Enhanced Cordless Telecommunications (DECT) signal.

9. The method of claim 1, wherein transmission priority of the first wireless signal is higher than the second wireless signal.

10. The method of claim 1, further comprising:
    determining a second transmission quality indicator corresponding to transmission quality of the second wireless signal; and
    turning the arbitrating back on when the second transmission quality indicator reaches a second threshold value.

11. A communication apparatus for arbitrating a transmission of a first wireless signal corresponding to a first wireless standard and a transmission of a second wireless signal corresponding to a second wireless standard, comprising:
    an arbitrating module, for controlling the transmission of the first wireless signal and the transmission of the second wireless signal; and
    a control module, coupled to the arbitrating module, for determining a transmission quality indicator corresponding to one of the first wireless signal and the second wireless signal and dynamically turning the arbitrating module on or off according to the transmission quality indicator,
    wherein the control module calculates a time period in which the transmission of the second wireless signal maintains continuous connection and updates the transmission quality indicator each time the time period is reaches a specific time length.

12. The communication apparatus of claim 11, wherein the control module turns on the arbitrating module when the arbitrating module is off and the transmission quality indicator reaches a first threshold value.

13. The communication apparatus of claim 11, wherein the control module updates the transmission quality indicator to reduce a difference between the transmission quality indicator and the first threshold value each time the time period is reached.

14. The communication apparatus of claim 11, wherein the control module further detects disconnections of the second wireless signal to determine the transmission quality indicator.

15. The communication apparatus of claim 14, wherein the control module updates the transmission quality indicator each time a disconnection of the second wireless signal is detected.

16. The communication apparatus of claim 15, wherein the control module updates the transmission quality indicator to reduce a difference between the transmission quality indicator and the second threshold value each time a disconnection of the second wireless signal is detected.

17. The communication apparatus of claim 11, wherein the control module turns off the arbitrating module when the arbitrating module is on and the transmission quality indicator reaches a second threshold value.

18. The communication apparatus of claim 11, wherein the arbitrating module is a Packet Traffic Arbitrator module.

19. The communication apparatus of claim 11, wherein bandwidths of the first wireless signal and the second wireless signal are overlapped.

20. The communication apparatus of claim 11, wherein the second wireless signal is a Wireless Fidelity (WiFi) signal, Worldwide Interoperability for Microwave Access (WiMAX) signal, High Performance Radio Local Area Network (HIPERLAN) signal or a Digital Enhanced Cordless Telecommunications (DECT) signal, and the first wireless signal is a Bluetooth signal.

21. The communication apparatus of claim 11, wherein transmission priority of the first wireless signal is higher than the second wireless signal.

22. The communication apparatus of claim 11, wherein the control module comprises a processor and a storage device storing a control program, and the processor executes the control program to determine the transmission quality indicator and dynamically turn the arbitrating module on or off according to the transmission quality indicator.

* * * * *